(12) United States Patent
Agrawal et al.

(10) Patent No.: US 12,399,912 B1
(45) Date of Patent: Aug. 26, 2025

(54) BOUNDARY DETECTION FOR SYNTHETIC DATA GENERATION

(71) Applicant: INTERNATIONAL BUSINESS MACHINES CORPORATION, Armonk, NY (US)

(72) Inventors: Bhavna Agrawal, Armonk, NY (US); Anuradha Bhamidipaty, Yorktown Heights, NY (US); Jayshree Sanjayam, Bangalore (IN); Jonathan D. Dunne, Dungarvan (IE); Sarika Budhiraja, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/762,609

(22) Filed: Jul. 2, 2024

(51) Int. Cl.
G06F 16/00 (2019.01)
G06F 16/28 (2019.01)

(52) U.S. Cl.
CPC .................. G06F 16/285 (2019.01)

(58) Field of Classification Search
CPC ..................................... G06F 16/285
USPC ....................................... 707/740
See application file for complete search history.

(56) References Cited

U.S. PATENT DOCUMENTS

| | | | | |
|---|---|---|---|---|
| 10,593,328 B1* | 3/2020 | Wang | .................. | H04L 65/1059 |
| | | | | 707/707 |
| 10,911,596 B1* | 2/2021 | Do | .......................... | G10L 17/00 |
| | | | | 707/707 |
| 2022/0076061 A1* | 3/2022 | Fiterman | ................ | G06V 10/82 |
| | | | | 707/707 |
| 2022/0188703 A1* | 6/2022 | Hong | ..................... | G06N 20/00 |
| | | | | 707/707 |
| 2023/0130703 A1* | 4/2023 | Bandyopadhyay | .... | G06N 3/047 |
| | | | | 703/7 |
| 2024/0112045 A1* | 4/2024 | Zoldi | ..................... | G06N 20/00 |
| | | | | 707/707 |

FOREIGN PATENT DOCUMENTS

| | | |
|---|---|---|
| CN | 115699094 A | 2/2023 |
| IN | 202341016557 A | 3/2023 |
| JP | 6617375 B2 | 12/2019 |

OTHER PUBLICATIONS

A. Yu and K. Grauman. "Semantic Jitter: Dense Supervision for Visual Comparisons via Synthetic Images". In ICCV, 2017.
Amirgh, Sehoonkim, Zhendong, Zheweiy, Mahoney, Keutzer. "A Survey of Quantization Methods for Efficient Neural Network Inference." University of California Berkeley. arXiv:2103.13630v3 [cs.CV]. Jun. 21, 2021.

(Continued)

*Primary Examiner* — Alexandria Y Bromell
(74) *Attorney, Agent, or Firm* — CHIP LAW GROUP (57) ABSTRACT

A computer-implemented method can determine a linguistic boundary condition for synthetic data generation in a multi-class classification problem. The method includes analyzing empirical labelled data using linguistic and vector representation techniques. The method further includes deriving a synthetic boundary conditional (SBC) model based on the analysis of the empirical labelled data and identifying a boundary location for performant synthetic data generation using the SBC model.

17 Claims, 10 Drawing Sheets

(56) References Cited

OTHER PUBLICATIONS

Andrew D. Back and Janet Wiles. "Estimating Sentence-like Structure in Synthetic Languages Using Information Topology" Entropy Mar. 15, 2022.
B. Tang and H. He, "KernelADASYN: Kernel based adaptive synthetic data generation for imbalanced learning." 2015.
Behl, H.S., Baydin, A.G., Gal, R., Torr, P.H.S., Vineet, V. (2020). "AutoSimulate: (Quickly) Learning Synthetic Data Generation." In: Vedaldi, A., Bischof, H., Brox, T., Frahm, JM. (eds) Computer Vision—ECCV 2020. ECCV 2020. "Lecture Notes in Computer Science( )." vol. 12367. Springer, Cham.
Dilmegani, Cem. "Synthetic Data Generation: Techniques Best Practices, & Tools." AI Multiple. Mar. 6, 2023, Updated Feb. 14, 2024.
G. Soltana, M. Sabetzadeh and L. C. Briand. "Synthetic data generation for statistical testing." 2017 32nd IEEE/ACM International Conference on Automated Software Engineering (ASE), Urbana, IL, USA. 2017. pp. 872-882, doi: 10.1109/ASE.2017.8115698.
J. W. Anderson, K. E. Kennedy, L. B. Ngo, A. Luckow and A. W. Apon. "Synthetic data generation for the internet of things." 2014 IEEE International Conference on Big Data (Big Data), Washington, DC, USA. 2014. pp. 171-176, doi: 10.1109/BigData.2014.7004228.
Jonas Fontana. "Comparison of Synthetic Time Series Data Generation Techniques." University of Fribourg, exascale Infolab. Sep. 7, 2021.
Khaled El Emam, Lucy Mosquera, Richard Hoptroff. "Practical synthetic data generation: balancing privacy and the broad availability of data." O'Reilly Media Inc. 2020.
Smith, D. M., Clarke, G. P., & Harland, K. (2009). Improving the Synthetic Data Generation Process in Spatial Microsimulation.
Firefox, "Transformations: an introduction", http://fmwww.bc.edu/repec/bocode/t/transint.html, Apr. 4, 2025, 15 pages.

\* cited by examiner

| 39 | State-gov | 77516 | Bachelors | 13 | Never-married | Adm-clerical | Not-in-family | White | Male | 2174 | 0 | 40 | United-States | <=50K |
| 50 | Self-emp-not-inc | 83311 | Bachelors | 13 | Married-civ-spouse | Exec-managerial | Husband | White | Male | 0 | 0 | 13 | United-States | <=50K |
| 38 | Private | 215646 | HS-grad | 9 | Divorced | Handlers-cleaners | Not-in-family | White | Male | 0 | 0 | 40 | United-States | <=50K |
| 53 | Private | 234721 | 11th | 7 | Married-civ-spouse | Handlers-cleaners | Husband | Black | Male | 0 | 0 | 40 | United-States | <=50K |
| 28 | Private | 338409 | Bachelors | 13 | Married-civ-spouse | Prof-specialty | Wife | Black | Female | 0 | 0 | 40 | Cuba | <=50K |
| 37 | Private | 284582 | Masters | 14 | Married-civ-spouse | Exec-managerial | Wife | White | Female | 0 | 0 | 40 | United-States | <=50K |
| 49 | Private | 160187 | 9th | 5 | Married-spouse-absent | Other-service | Not-in-family | Black | Female | 0 | 0 | 16 | Jamaica | <=50K |
| 52 | Self-emp-not-inc | 209642 | HS-grad | 9 | Married-civ-spouse | Exec-managerial | Husband | White | Male | 0 | 0 | 45 | United-States | >50K |
| 31 | Private | 45781 | Masters | 14 | Never-married | Prof-specialty | Not-in-family | White | Female | 14084 | 0 | 50 | United-States | >50K |
| 42 | Private | 159449 | Bachelors | 13 | Married-civ-spouse | Exec-managerial | Husband | White | Male | 5178 | 0 | 40 | United-States | >50K |
| 37 | Private | 280464 | Some-college | 10 | Married-civ-spouse | Exec-managerial | Husband | Black | Male | 0 | 0 | 80 | United-States | >50K |
| 30 | State-gov | 141297 | Bachelors | 13 | Married-civ-spouse | Prof-specialty | Husband | Asian-Pac-Islander | Male | 0 | 0 | 40 | India | >50K |
| 23 | Private | 122272 | Bachelors | 13 | Never-married | Adm-clerical | Own-child | White | Female | 0 | 0 | 30 | United-States | <=50K |
| 32 | Private | 205019 | Assoc-acdm | 12 | Never-married | Sales | Not-in-family | Black | Male | 0 | 0 | 50 | United-States | <=50K |
| 40 | Private | 121772 | Assoc-voc | 11 | Married-civ-spouse | Craft-repair | Husband | Asian-Pac-Islander | Male | 0 | 0 | 40 | ? | >50K |
| 34 | Private | 245487 | 7th-8th | 4 | Married-civ-spouse | Transport-moving | Husband | Amer-Indian-Eskimo | Male | 0 | 0 | 45 | Mexico | <=50K |
| 25 | Self-emp-not-inc | 176756 | HS-grad | 9 | Never-married | Farming-fishing | Own-child | White | Male | 0 | 0 | 35 | United-States | <=50K |
| 32 | Private | 186824 | HS-grad | 9 | Never-married | Machine-op-inspct | Unmarried | White | Male | 0 | 0 | 40 | United-States | <=50K |
| 38 | Private | 28887 | 11th | 7 | Married-civ-spouse | Sales | Husband | White | Male | 0 | 0 | 50 | United-States | <=50K |
| 43 | Self-emp-not-inc | 292175 | Masters | 14 | Divorced | Exec-managerial | Unmarried | White | Female | 0 | 0 | 45 | United-States | >50K |
| 40 | Private | 193524 | Doctorate | 16 | Married-civ-spouse | Prof-specialty | Husband | White | Male | 0 | 0 | 60 | United-States | >50K |
| 54 | Private | 302146 | HS-grad | 9 | Separated | Other-service | Unmarried | Black | Female | 0 | 0 | 20 | United-States | <=50K |
| 35 | Federal-gov | 76845 | 9th | 5 | Married-civ-spouse | Farming-fishing | Husband | Black | Male | 0 | 0 | 40 | United-States | <=50K |
| 43 | Private | 117037 | 11th | 7 | Married-civ-spouse | Transport-moving | Husband | White | Male | 0 | 2042 | 40 | United-States | <=50K |
| 59 | Private | 109015 | HS-grad | 9 | Divorced | Tech-support | Unmarried | White | Female | 0 | 0 | 40 | United-States | <=50K |

BOUNDARY DETECTION FOR SYNTHETIC DATA GENERATION

BACKGROUND

The present disclosure generally relates to systems and methods for boundary detection for synthetic data generation, and more particularly, to systems and methods for determining a linguistic boundary condition for synthetic data generation in a multi-class classification problem.

One of the challenges of using large language models (LLMs) for classification problems is the issue of shallow or small datasets. Such an empirical dataset is often enriched with synthetic data (generated by the LLM) to provide additional data for pre-training and/or fine-tuning.

However, the challenge with synthetic data generation, is that the newly created data should to be close to the empirical data, so that integrity of class label for the original data is maintained, but not too close (or almost identical) because then it does not provide any additional information to the classifier.

SUMMARY

A system, method and computer program code are described that provide a computer-implemented method for determining a linguistic boundary condition for synthetic data generation in a multi-class classification problem, the method includes analyzing empirical labelled data using linguistic and vector representation techniques. The method further includes deriving a synthetic boundary conditional (SBC) model based on the analyzing of the empirical labelled data and identifying a boundary location for performant synthetic data generation using the SBC model.

In some embodiments, the boundary location is defined by cartesian coordinates generated by the SBC model. This is a mapping from the higher dimensional embedding space.

In some embodiments, the analyzing of the empirical labelled data includes using corpus linguistics to determine key collocations of the empirical labelled data.

In some embodiments, the analyzing of the empirical labelled data includes using named entity recognition to determine key entities within each label category.

In some embodiments, analyzing the empirical labelled data includes representing key collocations and key entities using word embeddings within a multi-dimensional embedding space.

In some embodiments, the deriving of the SBC model further includes performing corpus linguistic analysis to determine an order and arrangement of terms in the empirical labelled data, performing name entity recognition (NER) to determine the key entities of the corpus, and mapping all word embeddings into a 2-dimensional cartesian space.

In some embodiments, the identifying of the boundary location using the SBC model further includes determining, by the SBC model, the distribution of the distance from the key collocations and key entities within each dataset class of the empirical labelled data; and a suitable distance using one or more central tendencies (e.g. mean or standard deviation) of a probability density distribution.

In some embodiments, the method further includes using the SBC model to measure a quality of synthetic data by calculating a similarity metric using the boundary location.

In some embodiments, the method further includes using the SBC model to pass synthetic data requirements to a large language model for synthetic data generation.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

As described in greater detail below, aspects of the present disclosure provide systems and methods that can determine a linguistic boundary condition for synthetic data generation in a multi-class classification problem.

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may determine a linguistic boundary condition for synthetic data generation in a multi-class classification problem. This may have the technical effect of ensuring the synthetic data representing the empirical data across all data classes of the empirical data. Further, the systems and methods according to embodiments of the present disclosure can be used to measure the quality of the synthetic data (generated using any method) by calculating a similarity metric using the boundary co-ordinates as determined by methods described in greater detail below. Accordingly, the system and methods according to embodiments of the present disclosure provide a substantial improvement to technology and computer functionality.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Figure 1:
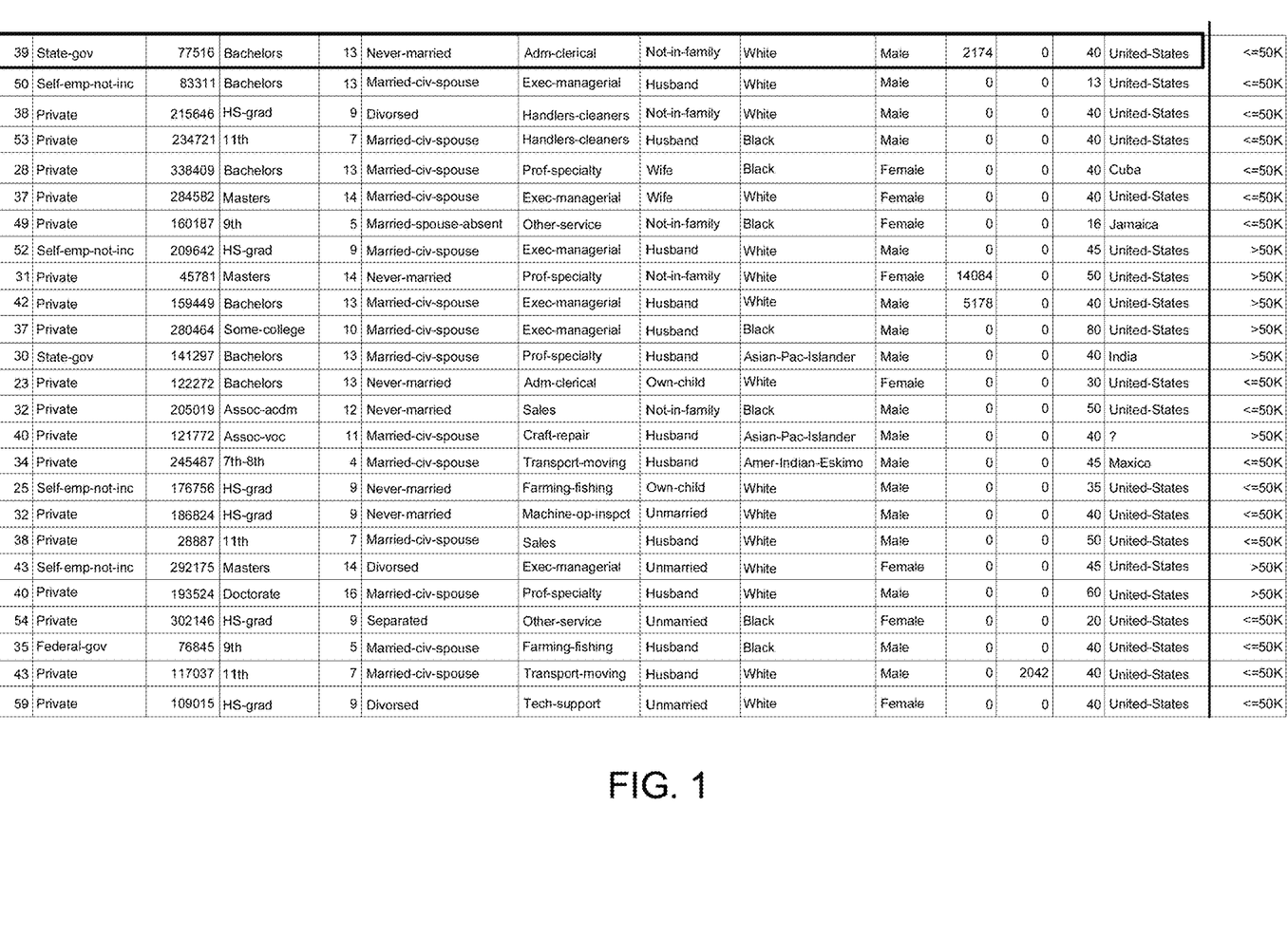
FIG. 1 shows an example of labelled empirical data to be analyzed according to methods consistent with an illustrative embodiment.
Figure 2:
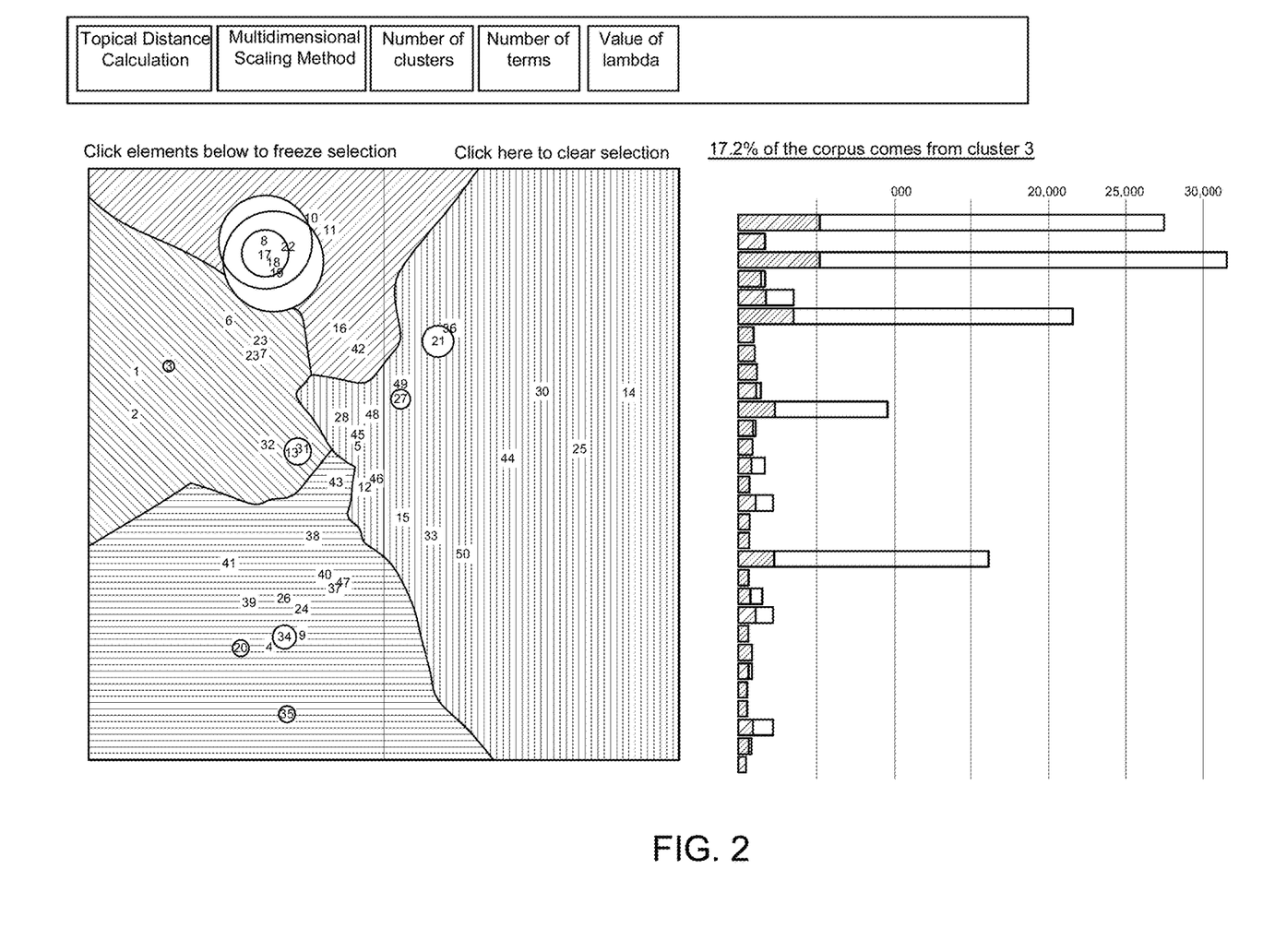
FIG. 2 shows an example of natural language processing performed on the dataset, consistent with an illustrative embodiment.

Embodiments of the present disclosure can provide systems and methods for determining a linguistic boundary condition for synthetic data generation in a multi-class classification problem. FIG. 1 shows an example of labeled empirical data that may be initially analyzed by linguistic and vector representation techniques. The analysis can include natural language processing, where an example of which is shown in FIG. 2. The technique presented in FIG. 2 is Latent Dirichlet allocation (LDA). The technique looks to group (cluster) key topic terms into "bundles", the graph depicted is typical of a visual output from an LDA model output. In natural language processing, machine learning technology can be used to provide the ability to understand and communicate in human language. Natural language processing can enable computers and digital devices to recognize, understand, and generate text and speech by combining computational linguistics—the rule-based modeling of human language-together with statistical modeling, machine learning (ML) and deep learning.

Figure 3:
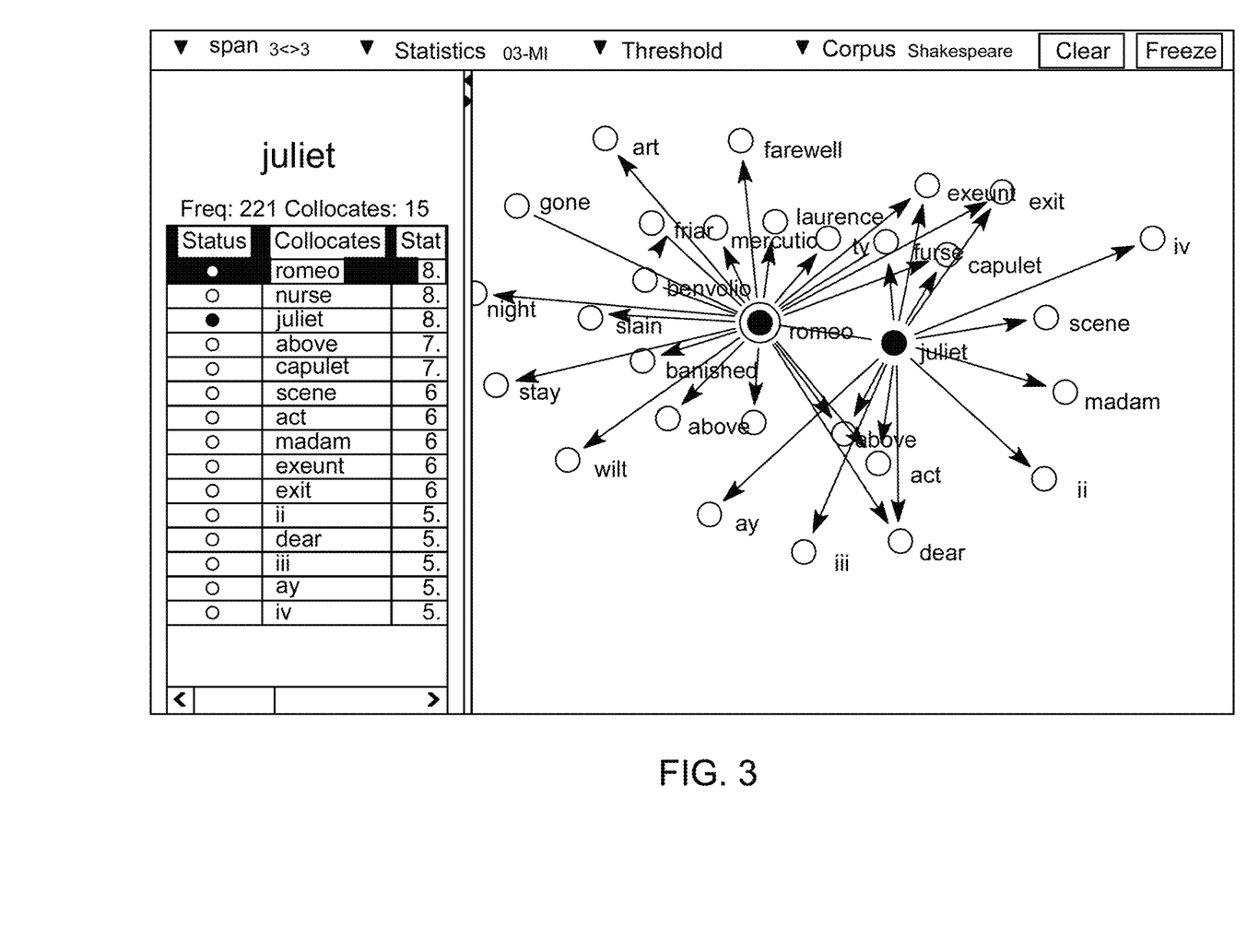
FIG. 3 shows an example of corpus linguistics performed on the dataset, consistent with an illustrative embodiment.

As shown in FIG. 3, the labeled empirical data can be evaluated by a corpus linguistic analysis to determine the order and arrangement of terms, including collocations and colligations. Corpus linguistic analysis can include statistically probing, manipulating and generalizing from a dataset. Analysis can include statistical evaluations, optimization of rule-bases, or knowledge discovery methods. As shown in FIG. 3, corpus linguistic analysis can include mapping words of the corpora to adjacent words, including a statistical analysis of times such a collocation is found. Such a corpus linguistic analysis can be used to determine the key collocations, also referred to as n-grams, of the labelled data. FIG. 3 shows a number of bi-grams for a Shakespeare corpus.

Figure 4:
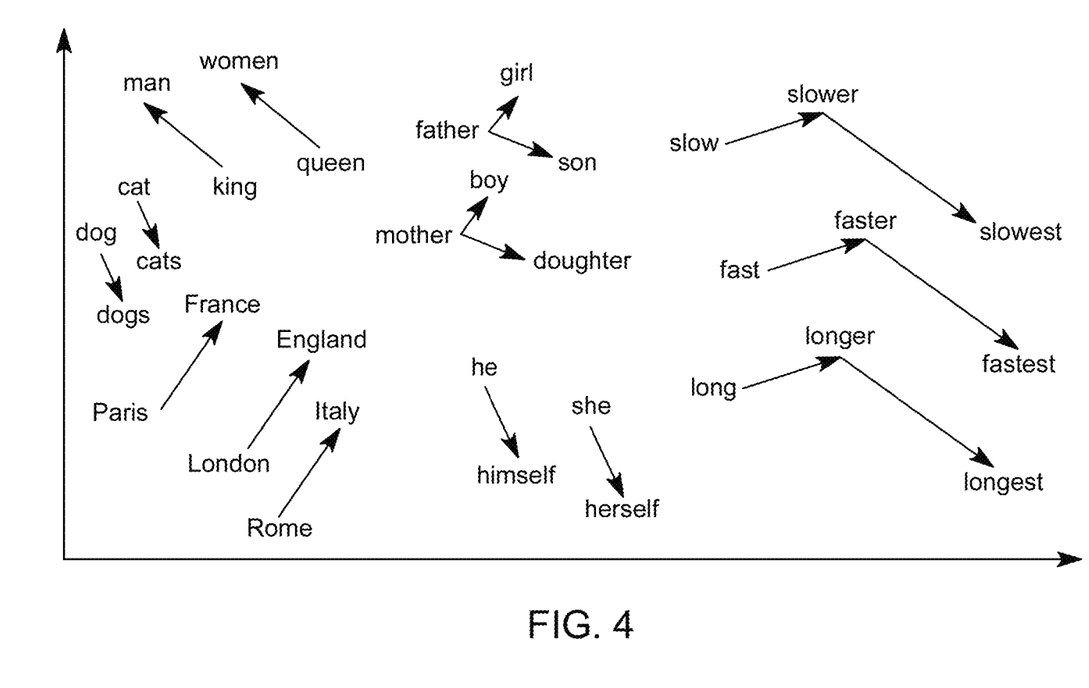
FIG. 4 shows an example of embedding comparison performed on the dataset, consistent with an illustrative embodiment.

The labeled empirical data can also be processed by a named entity recognition technique to determine the key entities within each label category. Named entity recognition can locate and classify named entities mentioned in unstructured text into pre-defined categories such as names, organizations, locations, and the like. Finally, as shown in FIG. 4, the key unigrams and entities are mapped to a 2D cartesian space from a multi-dimensional word embedding, such as Word2Vec or gloVe. A graph can also present the key unigrams and entities, as depicted in FIG. 4. Word2Vec, for example, uses shallow neural networks to produce word embeddings. Continuous Bag-of-Words (CBOW) and Skip-Gram are two types of Word2Vec, each capturing different word relationships. GloVe, as another example, is Stanford's Global Vectors for Word Representation algorithm, which works by aggregating global word-word co-occurrence matrix from a corpus, capturing both local and global context.

Figure 5:
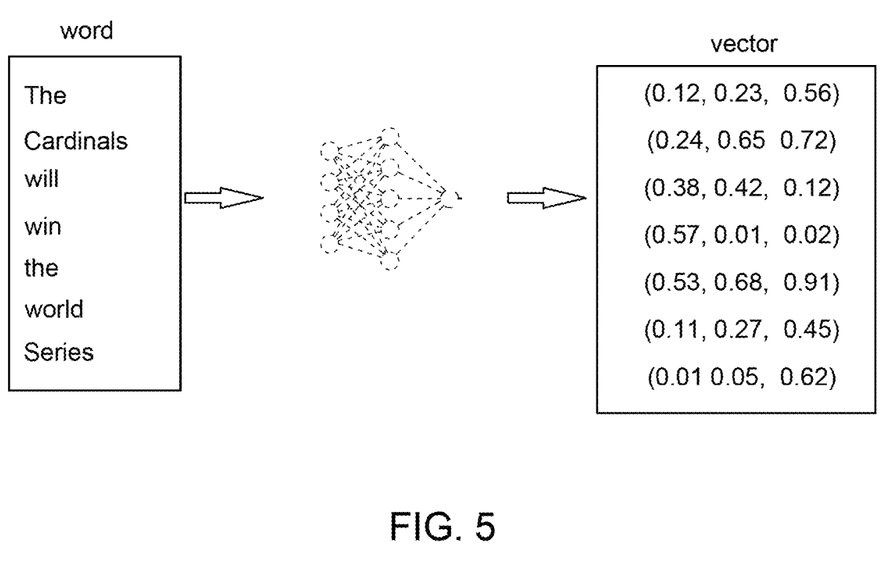
FIG. 5 shows word embeddings of all the words in a sentence, and the distance to the word embeddings of the key terms and entities is determined using methods like cosine similarity with these vectors.

Referring to FIG. 5, each of the words themselves in the embeddings can be represented by a numerical representation, where the numbers are represented in a positional coordinate manner. The measurement of the embedding analysis can be used to place particular terms positionally on multiple planes through multiple dimensions. Once the empirical data is analyzed, as described above, a synthetic boundary conditional model (SBC) can be derived as described below.

Figure 6:
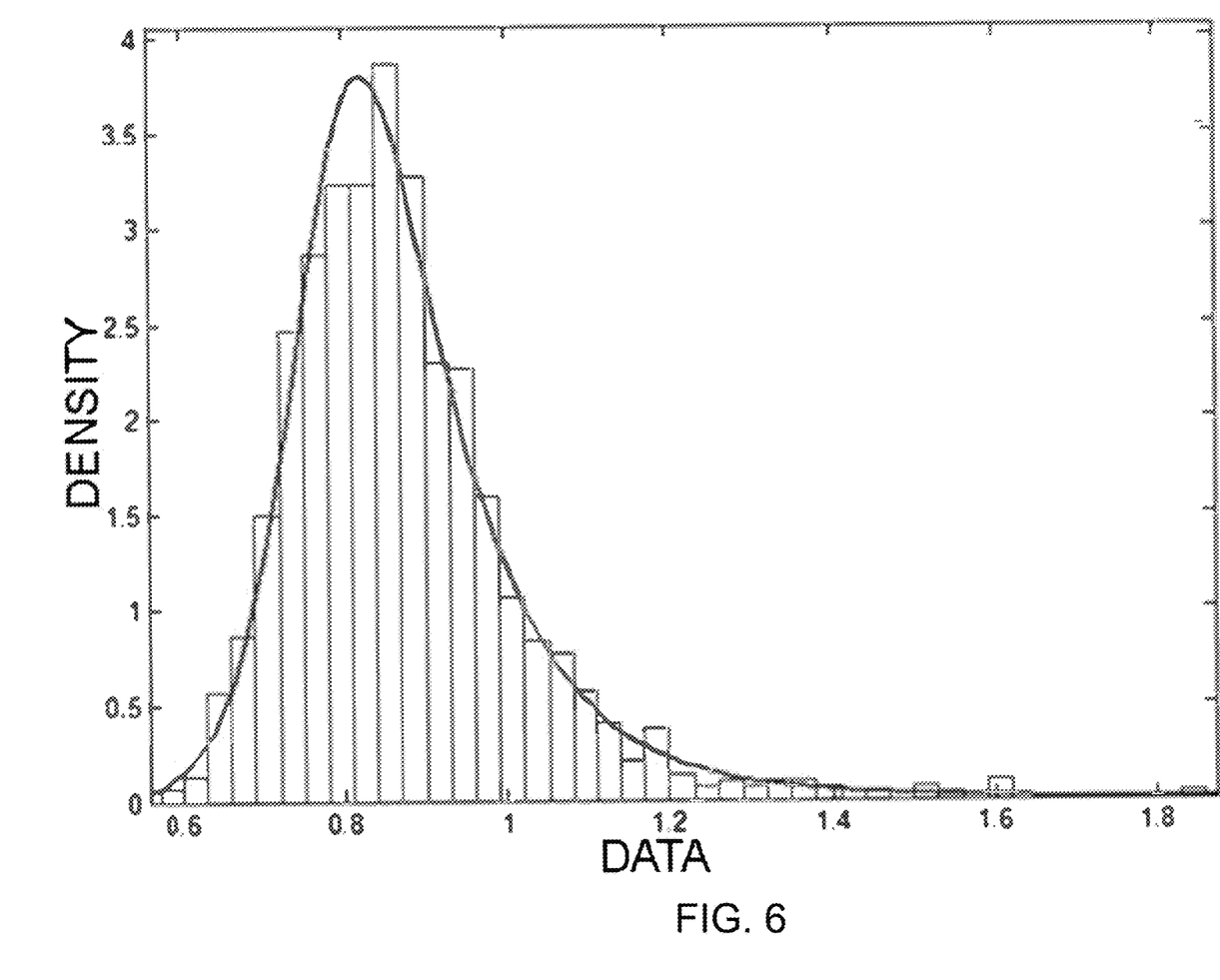
FIG. 6 shows a probability distribution density obtained from the distances determined in FIG. 5.
Figure 7:
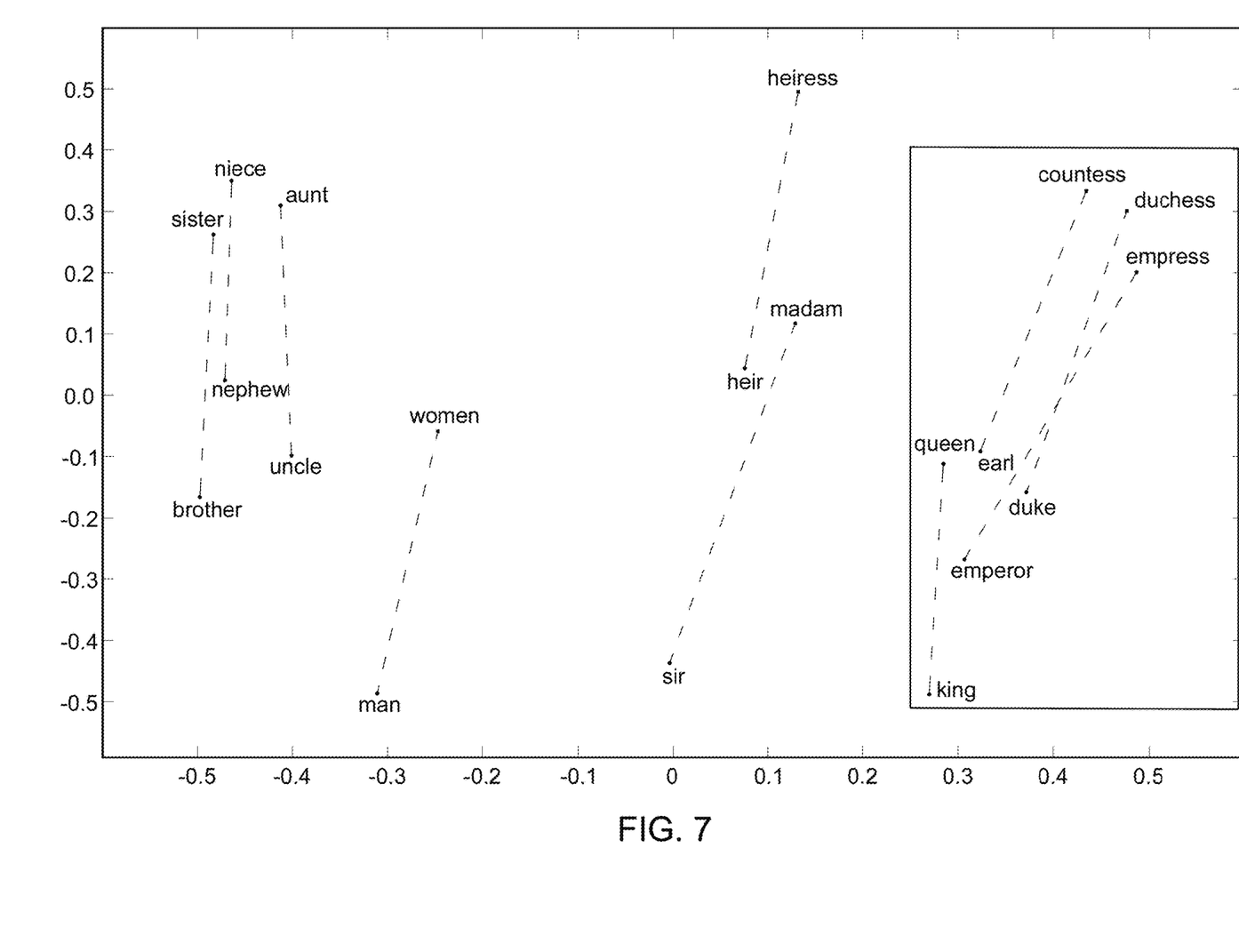
FIG. 7 shows boundary coordinates for a text corpus relative to n-gram key entities using the moments of the distribution of distances of FIG. 6.

Linear algebra can be used to determine the distance of key collocations and entities to all other words in the label classes of the labelled data, using methods like cosine similarity. These distances can be modelled as a probability distribution, as shown in FIG. 6. By using the moments of the distribution of the distances, boundary coordinates can be determined for a text corpus relative to n-gram key entities (key collocations). FIG. 7 illustrates an example of boundary coordinates that have been determined for a set of n-gram (bi-gram) key entities which are mapped to cartesian coordinates.

The resulting SBC model provides a positional representation of all the words that can be used to map key terms or key collection of terms in a multi-dimensional plane. This helps us provide a perimeter, such as the boundaries shown in FIG. 7. The SBC model can look at the extreme edges of each of the words that are embedded on the higher dimensional planes to understand what are the other location of words that are positioned in certain clusters. The system knows that particular words follow from a particular sequence. Thus, if the system knows the sequence and word positions on a 2D cartesian system, new words can be generated within the determined perimeter based on the distance measured from key terms.

In the example of FIG. 7, the phrasing is bounded in a particular shape, such as a rectangle shape in a mapping onto a 2-dimensional space. With the outer edges of the boundary known, the system can calculate a distance that the words are from each other. These distances can be collected and used to generate new words form that position. For example, the system can direct the LLM to generate a series of words that is one standard deviation from the empirical data. This can provide words that are not too far, yet not too close to the empirical data, while still being within the boundaries set by the SBC model. The collection of words distances can be modelled to a known probability density distribution, using a central tendency using as the mean or the first sigma distance rather than computing directly from the empirical distances.

The SBC model can be incorporated into an operational pipeline, where an existing data pipeline can be used to provide the empirical labelled data on which the above-described analysis are performed. The derived SBC model can output boundaries and can provide a series of automated prompts to an LLM to generate data within a boundary framework. The automated prompts can include a suggestion of particular terms that can be some distance away from an identified cluster of terms from the empirical data, or the automated prompts can provide embedding coordinates, so that the synthetic text generated by the LLM is generated from a curated set of instructions from the SBC model.

In other words, the boundary coordinates, generated by the SBC model, can be, for example, passed to a large language model (LLM) for the generation of additional data which respects the distance mappings defined by the boundary coordinates determined by the synthetic boundary conditional model.

While the above describes using the boundary coordinates for the generation of additional data, it should be understood that the SBC model may also be used to evaluate the additional data provided by the LLM.

Figure 8:
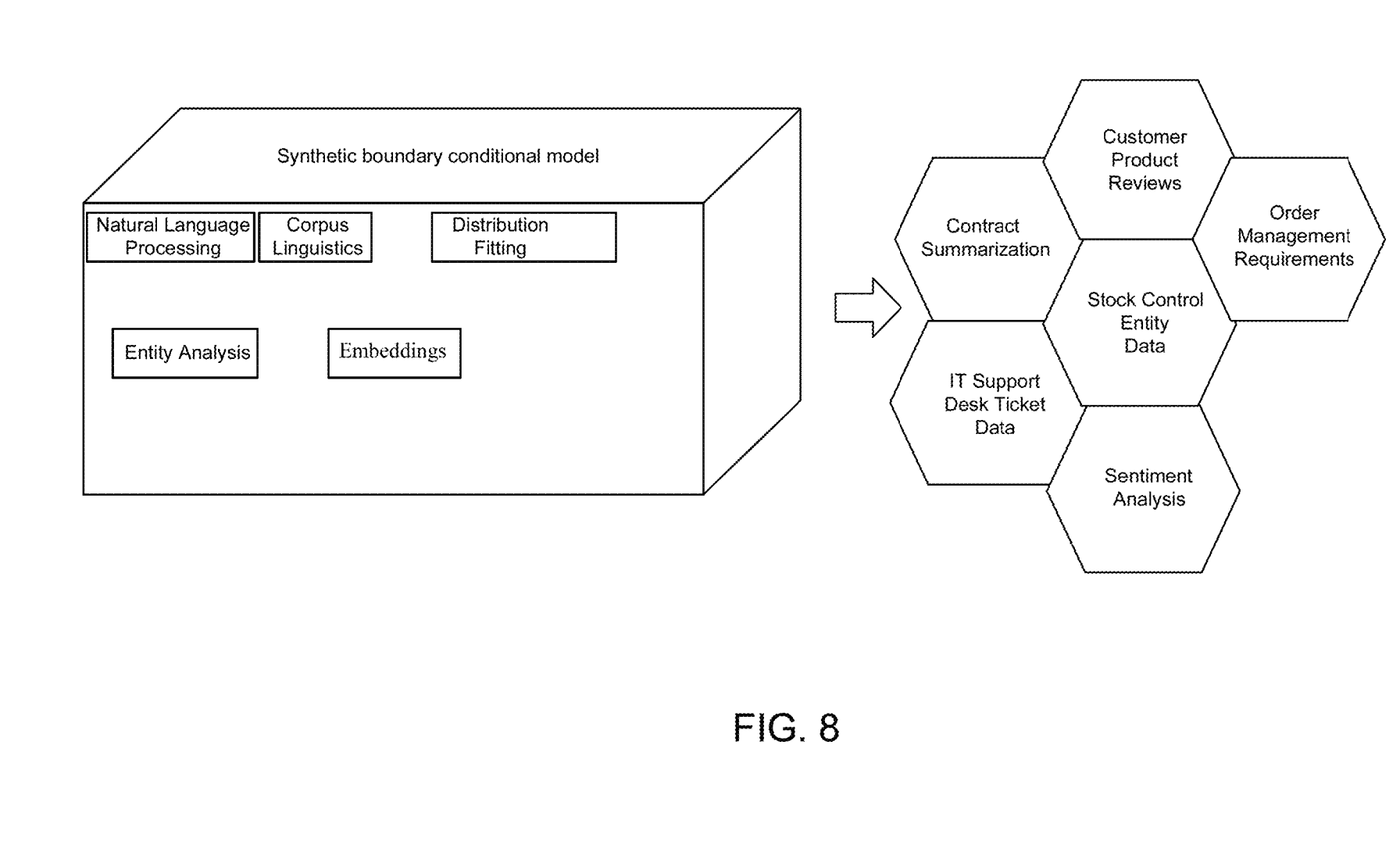
FIG. 8 shows how the synthetic boundary conditional model, consistent with an illustrative embodiment, can be generalized across multiple text corpora and domains.

Referring to FIG. 8, the system may be used within multiple domains, such as, in non-limiting examples, contract summarization, customer product reviews, order management requirements, stock control entity data, IT support desk ticket data, sentiment analysis, manufacturing data around maintenance/servicing, and the like.

Example Process

Figure 9:
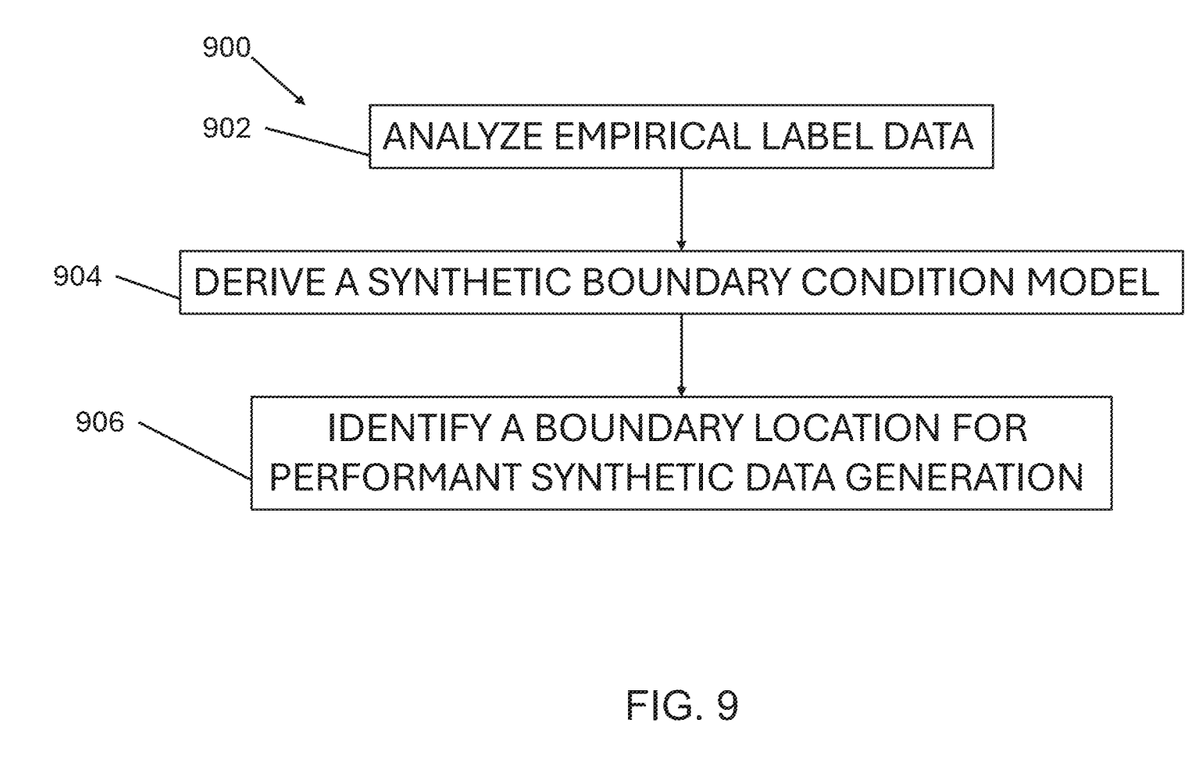
FIG. 9 shows a flow chart illustrating an overall process for determining a linguistic boundary condition for synthetic data generation in a multi-class classification problem, consistent with an illustrative embodiment.

It may be helpful now to consider a high-level discussion of an example process. To that end, FIG. 9 presents an illustrative process 900 related to the method for determining a linguistic boundary condition for synthetic data generation in a multi-class classification problem. Process 900 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 9, block 902 of process 900, can include an act of analyzing empirical labelled data. The empirical labelled data can be analyzed by, for example, existing linguistic and vector representation techniques. At block 904, the process 900 can include deriving a synthetic boundary conditional (SBC) model based on the analyzing of the empirical labelled data. At block 906, the process 900 can include identifying a boundary location (cartesian co-ordinates) for performant synthetic data generation using the SBC model. The boundary locations can be used for providing synthetic data from an LLM or for analyzing the synthetic data already provided by the LLM, for example.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
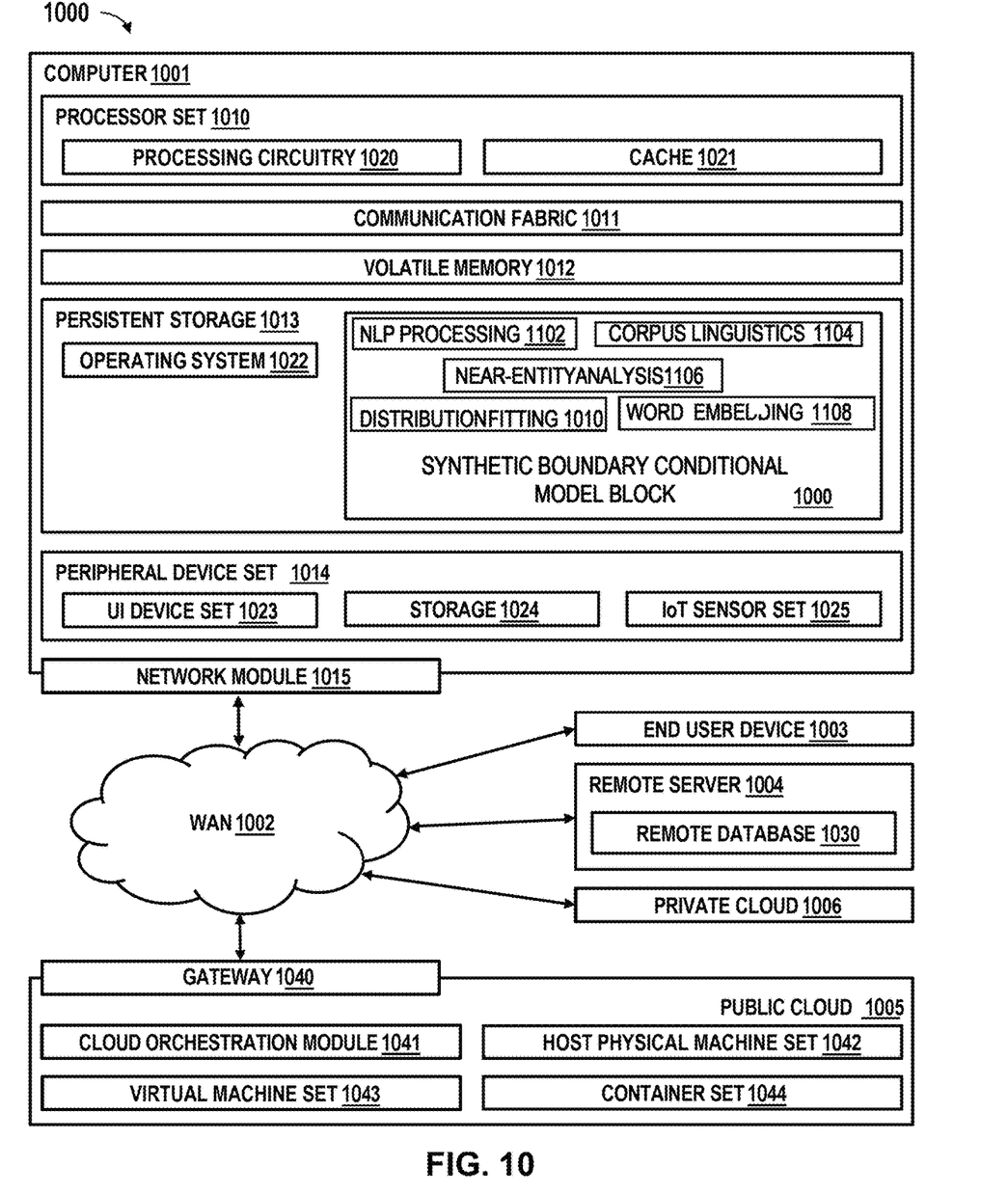
FIG. 10 is a functional block diagram illustration of a computer hardware platform that can be used to implement the method for determining a linguistic boundary condition for synthetic data generation in a multi-class classification problem, consistent with an illustrative embodiment.

Referring to FIG. 10, computing environment 1000 includes an example of an environment for the execution of at least some of the computer code involved in performing the inventive methods, including a synthetic boundary conditional model block 1100, which can include a natural language processing block 1102, a corpus linguistics block 1104, an entity analysis block 1106, an embedding comparison block 1108 and a distribution fitting block 1110. In addition to block 1100, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1000, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 9. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for determining a linguistic boundary condition for synthetic data generation in a multi-class classification problem, the method comprising:
    analyzing empirical labelled data using linguistic and vector representation techniques;
    deriving a synthetic boundary conditional (SBC) model based on the analyzing of the empirical labelled data; and
    identifying a boundary location for performant synthetic data generation using the SBC model, comprising:
        determining, by the SBC model, key collocations and key entities within each dataset class of the empirical labelled data; and
        calculating 2D coordinates of the key collocations and the key entities.

2. The computer-implemented method of claim 1, wherein the boundary location is defined by cartesian coordinates generated by the SBC model.

3. The computer-implemented method of claim 1, wherein the analyzing of the empirical labelled data includes using corpus linguistics to determine key collocations of the empirical labelled data.

4. The computer-implemented method of claim 3, wherein the analyzing of the empirical labelled data includes using named entity recognition to determine key entities within each label category.

5. The computer-implemented method of claim 4, wherein the analyzing of the empirical labelled data includes representing key collocations and key entities in a multi-dimension space using word embeddings.

6. A computer-implemented method for determining a linguistic boundary condition for synthetic data generation in a multi-class classification problem, the method comprising:
analyzing empirical labelled data using linguistic and vector representation techniques;
deriving a synthetic boundary conditional (SBC) model based on the analyzing of the empirical labelled data, comprising:
performing corpus linguistic analysis to determine an order and arrangement of terms in the empirical labelled data;
performing name entity recognition (NER) to determine key entities of the empirical labelled data; and
mapping all words from multi-dimension word embeddings into a 2-dimensional cartesian space; and
identifying a boundary location for performant synthetic data generation using the SBC model.

7. The computer-implemented method of claim 1, further comprising using the SBC model to measure a quality of synthetic data by calculating a similarity metric using the boundary location.

8. The computer-implemented method of claim 1, further comprising using the SBC model to pass synthetic data requirements to a large language model for synthetic data generation.

9. A system comprising:
a processor;
a memory coupled to the processor; and
a computer readable storage embodying a computer program code, the computer program code comprising instructions for determining a linguistic boundary condition for synthetic data generation in a multi-class classification problem, the instructions executable by the processor and configured to:
analyze empirical labelled data using linguistic and vector representation techniques;
derive a synthetic boundary conditional (SBC) model based on the analyzing of the empirical labelled data; and
identify a boundary location for performant synthetic data generation using the SBC model,
wherein the instructions are further configured to derive the SBC model by:
performing corpus linguistic analysis to determine an order and arrangement of terms in the empirical labelled data;
performing name entity recognition (NER) to determine key entities of the empirical labelled data; and
mapping all words using word embeddings into a 2-dimensional cartesian space.

10. The system of claim 9, wherein the boundary location is defined by cartesian coordinates generated by the SBC model.

11. The system of claim 9, wherein the instructions are further configured to analyze the empirical labelled data by:
using corpus linguistics to determine key collocations of the empirical labelled data;
using named entity recognition to determine key entities within each label category; and
representing key collocations and key entities in a 2D cartesian space mapped from higher dimension word embeddings.

12. The system of claim 9, wherein the instructions are further configured identify the boundary location using the SBC model by:
determining, by the SBC model, key collocations and key entities within each dataset class of the empirical labelled data; and
calculating 2D coordinates of the key collocations and the key entities.

13. The system of claim 9, wherein the instructions are further configured to use the SBC model to measure a quality of synthetic data by calculating a similarity metric using the boundary location.

14. The system of claim 9, wherein the instructions are further configured to use the SBC model to pass synthetic data requirements to a large language model for synthetic data generation.

15. A computer program product for determining a linguistic boundary condition for synthetic data generation in a multi-class classification problem, the computer program product comprising a computer readable storage medium having program instructions embodied therewith, the program instructions executable by a computer to cause the computer to:
analyze empirical labelled data using linguistic and vector representation techniques;
derive a synthetic boundary conditional (SBC) model based on the analyzing of the empirical labelled data; and
identify a boundary location, defined by 2D cartesian coordinates, for performant synthetic data generation using the SBC model by:
determining, by the SBC model, key collocations and key entities within each dataset class of the empirical labelled data; and
calculating the 2D coordinates of the key collocations and the key entities.

16. The computer program product of claim 15, wherein the program instructions are further configured to analyze the empirical labelled data by:
using corpus linguistics to determine key collocations of the empirical labelled data;
using named entity recognition to determine key entities within each label category; and
representing key collocations and key entities in a 2D cartesian space mapped from higher dimension word embeddings.

17. The computer program product of claim 15, wherein the program instructions are further configured to derive the SBC model by:
performing corpus linguistic analysis to determine an order and arrangement of terms in the empirical labelled data;
performing name entity recognition (NER) to determine key entities of the empirical labelled data; and
mapping all words using higher-dimension word embeddings into a 2-dimensional cartesian space.

* * * * *